United States Patent
Debonville et al.

(10) Patent No.: US 10,490,093 B2
(45) Date of Patent: Nov. 26, 2019

(54) SYSTEM AND METHOD FOR CONTROLLABLY ADJUSTING TEMPERATURE OF A TRAINING AREA OF AN INTERACTIVE TRAINING SIMULATOR

(71) Applicant: CAE Inc., Saint-Laurent, QC (CA)

(72) Inventors: Eric Debonville, Saint-Laurent (CA); Sebastien Labelle, Saint-Laurent (CA)

(73) Assignee: CAE Inc., St-Laurent, QC (CA)

( * ) Notice: Subject to any disclaimer, the term of this patent is extended or adjusted under 35 U.S.C. 154(b) by 24 days.

(21) Appl. No.: 15/942,033

(22) Filed: Mar. 30, 2018

(65) Prior Publication Data

US 2019/0304318 A1   Oct. 3, 2019

(51) Int. Cl.
- *G09B 5/06* (2006.01)
- *G05B 15/02* (2006.01)
- *G05D 23/19* (2006.01)

(52) U.S. Cl.
CPC ............ *G09B 5/06* (2013.01); *G05B 15/02* (2013.01); *G05D 23/1917* (2013.01); *G05D 23/1919* (2013.01)

(58) Field of Classification Search
None
See application file for complete search history.

(56) References Cited

U.S. PATENT DOCUMENTS

| | | | | |
|---|---|---|---|---|
| 4,629,430 A | * | 12/1986 | Sakamoto | G09B 25/02 434/219 |
| 4,977,529 A | * | 12/1990 | Gregg | G05B 17/02 376/245 |
| 5,009,598 A | * | 4/1991 | Bennington | G09B 9/08 244/194 |
| 5,240,416 A | * | 8/1993 | Bennington | G09B 9/08 244/75.1 |
| 5,421,728 A | * | 6/1995 | Milden | G01S 7/021 342/169 |

(Continued)

FOREIGN PATENT DOCUMENTS

EP          2461661          6/2012

*Primary Examiner* — Ramesh B Patel
(74) *Attorney, Agent, or Firm* — Gowling WLG (Canada) LLP; Benoit Yelle (57) ABSTRACT

It is disclosed a method and system for controllably adjusting temperature of a training area of an interactive training simulator performing an interactive computer simulation. The interactive training simulator, such as a flight simulator, is associated with a non-simulated area (NSA) housing electronic components used for performing the simulation. The heat generated in the NSA is transferred to the training area, or cockpit, hence eliminating the need for a heating system. Hence, the controlled recirculation of the hot air into the non-simulated area (NSA) improves efficiency of the interactive training simulator and reduces energy consumption. The system also maintains air quality inside the training area by continuously monitoring non-temperature related parameters such as humidity, or gas, volatile organic compounds (VOC) or particle concentrations. The system and method disclosed herewith are eco-friendly in that they allow reducing the amount of electricity for operating the interactive training simulator, and as such reducing the amount of $CO_2$.

20 Claims, 6 Drawing Sheets

(56) References Cited

U.S. PATENT DOCUMENTS

| | | | | |
|---|---|---|---|---|
| 5,443,260 A | * | 8/1995 | Stewart | A63B 69/0002 473/421 |
| 5,882,204 A | * | 3/1999 | Iannazo | A63B 24/0021 434/247 |
| 5,954,508 A | * | 9/1999 | Lo | G09B 9/02 297/257 |
| 8,054,625 B2 | * | 11/2011 | Noteboom | H05K 7/20736 361/688 |
| 8,355,251 B2 | | 1/2013 | Sim et al. | |
| 8,385,065 B2 | * | 2/2013 | Weaver | G03B 15/006 165/104.33 |
| 2008/0174954 A1 | * | 7/2008 | VanGilder | H05K 7/20745 361/679.54 |
| 2011/0231320 A1 | * | 9/2011 | Irving | G06Q 30/00 705/80 |
| 2012/0118553 A1 | | 5/2012 | Chang et al. | |
| 2012/0138285 A1 | * | 6/2012 | Tsubaki | H05K 7/20781 165/293 |
| 2015/0221230 A1 | * | 8/2015 | Karadjian | G09B 9/00 434/353 |
| 2016/0293037 A1 | * | 10/2016 | Jacques | G09B 9/02 |
| 2017/0059199 A1 | | 3/2017 | Zhang et al. | |

* cited by examiner

```
┌─────────────────────────────────────────────────┐
│                                                 │
│  Controllably dividing the forced airflow       │
│  between a reused portion and a wasted portion  │
│  ranging from 0 to 100% of the forced airflow   │
│  2052                                           │
│                                                 │
└─────────────────────────────────────────────────┘
                         │
                         ▼
┌─────────────────────────────────────────────────┐
│                                                 │
│  Combining the reused portion of the forced     │
│  airflow and a fresh airflow into a controlled  │
│  airflow before injecting the controlled        │
│  airflow into the training area 2054            │
│                                                 │
└─────────────────────────────────────────────────┘
```

SYSTEM AND METHOD FOR CONTROLLABLY ADJUSTING TEMPERATURE OF A TRAINING AREA OF AN INTERACTIVE TRAINING SIMULATOR

TECHNICAL FIELD

The present application relates to interactive computer simulations and, more particularly, to temperature control in a training area of an interactive training simulator.

BACKGROUND

Interactive computer simulation systems are used to train personnel on complex and/or risky tasks. The interactive computer simulation allows a user to train in a computer generated environment by controlling a simulated element (e.g., an aircraft, a ground vehicle, a space station, etc.). Immersivity of the interactive computer simulation systems helps to provide a training environment that allows the trainees to easily port the experience and competence developed in a simulator to the real world environment.

Interactive computer simulation systems have high electric power needs when in operation, which represents an important portion of the operational costs of the Interactive computer simulation systems, both in terms of direct monetary costs and indirect environmental costs.

Reducing power consumption of a simulator is therefore a desirable objective, which is typically in contradiction with quality of the interactive computer simulation supported by the simulator.

The present invention aims at meeting the challenge of reducing power consumption of an interactive computer simulation system while maintaining or improving the quality of the interactive computer simulation being supported thereby.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is disclosed a method and a system for collecting heat generated by the various components of a simulator and directing the heat to an enclosed area while optionally continuously monitoring the air quality of the area.

In accordance with a first aspect, a method is provided for controllably adjusting temperature of a training area of an interactive training simulator performing an interactive computer simulation. The training area hosts one or more users and the interactive training simulator associated with a non-simulated area (NSA) houses electronic components used for performing the interactive computer simulation. The method comprises defining a target temperature level for the training area when the interactive training simulator is in use; cooling the electronic components of the NSA using a forced airflow therethrough when the interactive training simulator is in use; capturing heat from the forced airflow exiting the NSA; modifying the defined target temperature level at least once during the interactive computer simulation and based on events related to the interactive computer simulation being performed in the interactive training simulator; and selectively and controllably transferring heat from the forced airflow to the training area for maintaining the modified target temperature level.

In some embodiments, the interactive training simulator comprises an instructor operating system (IOS) in the training area for managing the interactive computer simulation, and the one or more users comprises at least one trainee and one instructor of the at least one trainee. The method thus comprises triggering, by the instructor and via the IOS, the events related to the interactive computer simulation for modifying the target temperature level. The interactive training simulator may also comprise an instrument module for interactively controlling a simulated element in the interactive computer simulation. The one or more users may thus comprise at least one trainee. The method then comprising: triggering, by the at least one trainee and via the instrument module, the events related to the interactive computer simulation for modifying the target temperature level.

In some embodiments, the method may further comprise: defining at least one non-temperature-related ambient environment parameter for the training area; and continuously monitoring and tracking the at least one ambient environment parameter of the training area. Preferably, the step of continuously monitoring and tracking the at least one ambient environment parameter of the training area may comprise measuring at least one of: a level of humidity, a concentration of gas comprising carbon monoxide, carbon dioxide, oxygen, nitrogen or ozone, a concentration of at least one volatile organic compound (VOC), or a concentration of fine particles.

In some embodiments, the method may further comprise injecting an amount of at least one aroma into the training area for simulating a variation of smell into the training area.

In some embodiments, the step of selectively and controllably transferring heat from the forced airflow to the training area for maintaining the modified temperature level in the training area may comprise: controllably dividing the forced airflow between a reused portion and a wasted portion ranging from 0 to 100% of the forced airflow, and optionally combining the reused portion of the forced airflow and a fresh airflow into a controlled airflow before injecting the controlled airflow into the training area. Optionally, the method may also comprise the step of heating the forced airflow exiting the NSA when the heat generated in the NSA is insufficient for obtaining and/or maintaining the target temperature level in the training area. In some embodiments, the method may further comprise: capturing an exiting airflow from the training area, and combining the exiting airflow with the forced airflow before the NSA, thereby forming an airflow loop circuit between the training area and the NSA.

In some embodiments, the NSA is structurally independent from the interactive training simulator. Alternatively, the NSA and the interactive training simulator may be structurally dependent.

A second aspect is directed to a system for controllably adjusting temperature of a training area of an interactive training simulator performing an interactive computer simulation. The training area is configured for hosting one or more users and the interactive training simulator being associated with a non-simulated area (NSA) housing electronic components used for performing the interactive computer simulation. The system comprises a processor module for defining a target temperature level for the training area when the interactive training simulator is in use, and for modifying the target temperature level at least once during the interactive computer simulation and based on events related to the interactive computer simulation being performed in the interactive training simulator. The system also comprises a ventilation and air conditioning (VAC) unit configured for cooling the electronic components of the NSA by circulating a forced airflow therethrough when the interactive training simulator is in use. The system further comprises an airflow selector unit, controlled by the processor module that operatively transfers heat from the forced airflow to the training area for maintaining the target temperature level or for modifying and maintaining the modified target temperature level.

In some embodiments, the one or more users comprise at least one trainee and one instructor of the at least one trainee. The interactive training simulator comprises an instructor operating system (IOS) in the training area for managing the interactive computer simulation, the processor module of the system being operatively connected to the IOS for triggering, by the instructor and via the IOS, the events related to the interactive computer simulation for modifying the target temperature level. Also, the one or more users comprises at least one trainee and the interactive training simulator comprises an instrument module for interactively controlling a simulated element in the interactive computer simulation. The processor module of the system being operatively connected to the instrument module for triggering, by the at least one trainee and via the instrument module, the events related to the interactive computer simulation for modifying the target temperature level.

In some embodiments, the processor module also allows defining at least one non-temperature-related ambient environment parameter of the training area, the system further comprising at least one sensor for continuously monitoring and tracking the at least one ambient environment parameter of the training area.

In some embodiments, the airflow selector unit comprises at least one air duct connecting the VAC and NSA to the training area, each air duct comprising an airflow divider controlled by the processor module for dividing the forced airflow upwardly from the training area and injecting only a defined portion of the forced airflow into the training area. Preferably, each air duct also comprises an airflow combiner operatively controlled by the processor module for combining the forced airflow entering the training area with a fresh airflow for cooling the forced airflow entering the training area.

In some embodiments, the system further comprises another air duct connecting the training area to the NSA for capturing air from the training area, transferring the air from the training area to the NSA, and combining the captured air with the forced airflow going through the NSA, forming as such an airflow loop circuit between the interactive training simulator and the NSA.

In some embodiments, the NSA is structurally independent from the interactive training simulator. Alternatively, the NSA and the interactive training simulator are structurally dependent. IN other words, the NSA can be located either outside the interactive training simulator, or inside the interactive training simulator and adjacent to the training area.

In some embodiments, the system further comprises a VOC sensor operatively connected to the airflow selector unit for measuring upwardly from the training area an amount of at least one volatile organic compound (VOC) generated by the electronic components of the NSA.

In some embodiments, the interactive training simulator is a flight simulator and the training area is a cockpit of the flight simulator replicating an actual cockpit from an actual aircraft.

A third aspect of the invention is directed to an interactive training simulator performing an interactive computer simulation and including the system as defined herein for controllably adjusting a temperature of the training area of the interactive training simulator.

The above disclosed method and system allow maintaining and controlling ambient temperature by transferring heat generated by various components of an interactive training simulator to an area where heat is required in the training area, such as a pilot's seating area, hence eliminating the need for a heating system for the interactive training simulator to function. In existing systems, the air conditioning units controls the temperature at 13-15° C. For example, the temperature above the projectors is 24-28° C. The ideal temperature of the pilot's seating area in an interactive training simulator is 18-22° C. for maintaining a comfortable environment for the instructor and trainee. Hence, the recirculation of the hot air into the non-simulated area improves efficiency of the interactive training simulator and reduces energy consumption. The system maintains the air quality of the pilot's seating area by continuous monitoring. Measurements such as humidity, carbon monoxide, carbon dioxide, nitrogen, ozone, air pressure, etc. can be monitored to maintain the ambient environment for the pilot seated in the interactive training simulator. The system and method disclosed herewith are eco-friendly in that it allows considerably reducing the amount of electricity for operating the interactive training simulator, and as such reducing the amount of $CO_2$ produced.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Interactive computer simulation systems require electric power to run, and the electrical consumption repartition of a typically immersive flight simulator has been estimated as follows:

32% for the motion system;
17% for the heater;
15% for the cockpit and the non-simulation area (NSA);
12% for the air conditioning unit;
9% for the visual complex;

8% for the computing complex;
4% for the visual projector; and
3% for the control loading.

As aforesaid, 17% of the electricity is consumed by the heater unit that is generally used for heating the training area (also named "seating area" or the cockpit in the case of a flight simulator). The air conditioning unit consumes 12% of the electricity and is used to cool down the NSA of the interactive training simulator which comprises different electronic apparatus used for running the interactive training simulator. Examples of electronic components include, but are not limited to, audio amplifier, audio or video communication systems, power supply, and other electronic racks, which generate heat when the interactive training simulator is operating. 15% of the electricity consumption is for running the electronic components of the cockpit end and the NSA. The NSA generally comprises a ventilation port for receiving air for cooling the electronic components to avoid overheating. As can be appreciated, energy is thus used for simultaneously cooling down some sections of the interactive training simulator whereas other sections need to be heated. This configuration of the interactive training simulator is not eco-friendly in that it leads to an important loss of energy.

The teachings presented herein provide for an improved configuration of an interactive training simulator which will allow for reducing electricity consumption while controllably adjusting temperature of a training area of an interactive training simulator. In particular, embodiments support simulating ambient environment conditions (including temperature and, optionally, other air-related parameters such as odors or smoke) of the training area of the interactive training simulator considering events from the interactive computer simulation. For instance, the interactive training simulator may be a flight simulator and the training area may be the cockpit of the flight simulator replicating an actual cockpit from an actual aircraft and the temperature in the replicated cockpit may be simulated in real-time considering simulated conditions related to the interactive computer simulation being performed.

Figure 1:
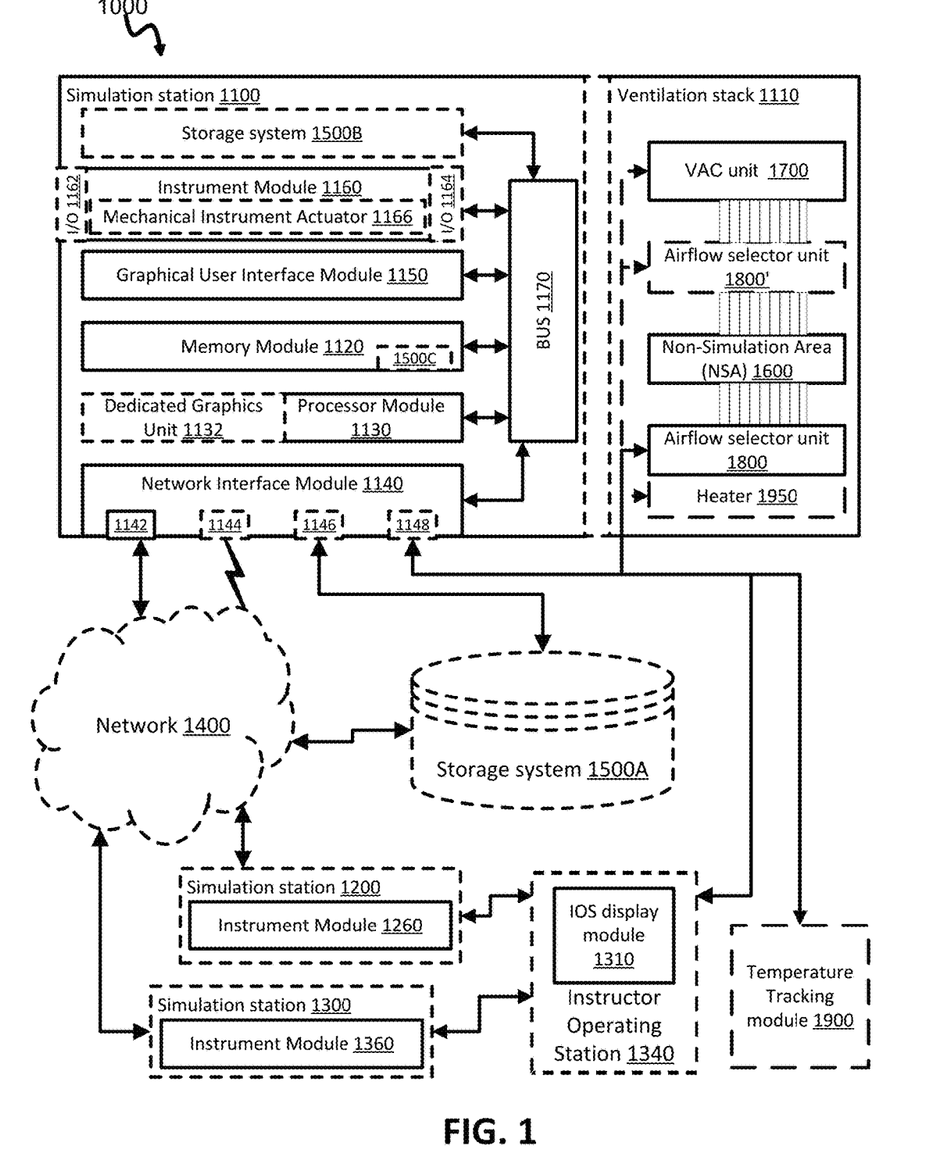
FIG. 1 is a logical modular view of an exemplary interactive computer simulation system in accordance with an embodiment of the present invention.

Reference is now made to the drawings in which FIG. 1 shows a logical modular view of an exemplary interactive computer interactive system 1000 in accordance with the teachings of the present invention. The interactive computer simulation system 1000 performs one or more interactive computer simulations. Each interactive computer simulation comprises one or more virtual simulated elements each representing an actual system (e.g., multiple virtual aircraft systems each representing an actual aircraft). Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. The virtual simulated element, or simulated element, is defined herein as a simulated system comprising multiple simulated dynamic sub-systems, or dynamic sub-systems. The simulated element is a virtual version that simulates, to the extent required by the interactive computer simulation, behavior of an actual system. Correspondingly, each of the simulated dynamic sub-systems of the simulated element is a virtual version, to the extent required but the interactive computer.

In the depicted embodiment of FIG. 1, the interactive computer simulation system 1000 comprises an interactive computer simulation station 1100 (also referred to as interactive computer simulator or, simply, simulation station or simulator) for visualizing dynamic sub-systems from at least one of the virtual simulated elements from the computer simulation executed on the interactive computer simulation system 1000. The interactive computer simulation system 1000 typically comprises one or more simulation stations 1100, 1200 and 1300 that each allow one or more users to interact to control a virtual simulated element in one of the interactive computer simulation(s) of the interactive computer simulation system 1000. The simulation stations 1100, 1200 and 1300 may be connected via a network 1400, via direct connections or a mix of direct and network connections. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

In the depicted example of FIG. 1, the interactive computer simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain expected realism of such immersive simulation. In some embodiments, each of the simulation stations 1200, 1300 comprise a processor module having a dedicated graphics processing unit similar to the dedicated graphics processing unit 1132. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the interactive computer simulation station 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the interactive computer simulation station 1100. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the interactive computer simulation station 1100 to perform routine as well as innovative steps related to the present invention.

The interactive computer simulation system 1000 comprises a storage system 1500 for logging dynamic data in relation to the dynamic sub-systems while the interactive computer simulation is performed. FIG. 1 shows examples of the storage system 1500 as a distinct database system 1500A, a distinct module 1500B of the interactive computer simulation station 1100 or a sub-module 1500C of the memory module 1120 of the interactive computer simulation station 1100. The storage system 1500 may also comprise storage modules (not shown) on the simulation stations 1200, 1300. The storage system 1500 may be distributed over different systems A, B, C and/or the simulations stations 1200, 1300 or may be in a single system. The storage system 1500 may comprise one or more logical or physical as well as local or remote hard disk drive (HDD) (or an array thereof). The storage system 1500 may further comprise a local or remote database made accessible to the interactive computer simulation station 1100 by a standardized or proprietary interface or via the network interface module 1140. The variants of storage system 1500 usable in the context of the present invention will be readily apparent to persons skilled in the art.

The interactive computer simulation station 1100 comprises a graphical user interface (GUI) module 1150 that ultimately allows the visualization of virtual dynamic sub-systems from the virtual simulated element. The GUI module 1150 may comprise one or more display screens such as a wired or wireless flat screen, a wired or wireless touch-sensitive display, a tablet computer, a portable computer or a smart phone.

An Instructor Operating Station (IOS) 1340 may be provided for allowing various management tasks (not shown) to be performed in the interactive computer simulation system 1000. The tasks associated with the IOS 1340 allow for control and/or monitoring of one or more ongoing interactive computer simulations. For instance, the IOS 1340 may be used for allowing an instructor to participate to the interactive computer simulation and possibly additional interactive computer simulation(s). In some embodiments, the IOS 1340 is provided by the interactive computer simulation station 1100. In other embodiments, the IOS 1340 may be co-located with the interactive computer simulation station 1100 (e.g., within the same room or simulation enclosure) or remote therefrom (e.g., in different rooms or in different locations). Skilled persons will understand the many instances of the IOS 1340 may be concurrently provided in the interactive computer simulation system 1000. The IOS 1340 may provide a computer simulation management interface, which may be displayed on a dedicated IOS display module (not shown) or the GUI module 1150. The IOS 1340 could be located in close proximity with the interactive computer simulation station 1100, but may also be provided outside of the interactive computer simulation station 1100, in communication therewith.

When multiple simulation stations 1100, 1200 and 1300 are present in the system 1000, the IOS 1340 may present different views of the computer program management interface (e.g., to manage different aspects therewith) or they may all present the same view thereof. The computer program management interface may be permanently shown on a first of the screens of the IOS display module while a second of the screen of the IOS display module shows a view of the interactive computer simulation (i.e., adapted view considering characteristics of the second screen). The computer program management interface may also be triggered on the IOS 1340, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation stations 1100, 1200 and/or 1300. A virtualized IOS may also be provided to the user (e.g., through the GUI module 1150) on a main screen, on a secondary screen or a dedicated screen. In some embodiments, a Brief and Debrief System (BDS) may also be provided. The BDS may be seen as a version of the IOS 1340 used during playback of recorded data only.

For instance, when IOS and/or BDS functionalities are provided through the interactive computer simulation station 1100, the GUI module 1150 may further be used to monitor and control one or more ongoing or recorded interactive computer simulation (e.g., triggering/monitoring events and/or selecting a perspective from which to view the ongoing or recorded chain of events of one or more interactive computer simulation).

Users of the interactive computer simulation system 1000 (e.g., users of the simulation stations 1100, 1200 and/or 1300) may interact in the interactive computer simulation to control a virtual simulated element in a computer generated environment of the interactive computer simulation system 1000 (e.g., instructors or experts, trainees such as a pilot and co-pilot, a driver, an operator, a surgeon, a flight investigator, a training analyst, a flight analyst, etc.). Examples of virtual simulated elements include a simulated aircraft system, a simulated ground vehicle system, a simulated spacecraft or space station system, a simulated control room system, unmanned vehicle or drone, simulated human mannequin, etc. Examples of virtual dynamic sub-systems vary depending on the virtual simulated element. In the example of a simulated aircraft system, typical virtual dynamic sub-systems may include virtual hydraulic systems, virtual communication systems, virtual display systems, virtual wiring systems, virtual in-flight entertainment systems, virtual fuel systems, virtual lighting systems, virtual rudder system, virtual flap system, virtual landing gear system, etc. When a trainee or user is involved, actual measurements of biometric data may also be recorded (e.g., for subsequent correlation with other recorded data). For instance, biometric data from a pilot interacting in a computer simulation with one or more tangible instruments at the simulation station 1200 may be recorded (such as temperature, blood pressure and other related physical data). As a skilled person would appreciate, most virtual sub-systems are directly or indirectly affected by interactions of the user with one or more tangible instruments that allow the user to interact (e.g., provide different commands in order to control the virtual simulated element) during the interactive computer system in the computer generated environment. Some other virtual sub-systems may be affected by time elapsed during the interactive computer system and may further take into account the interactions of the user with one or more tangible instruments. For instance, in the example of a simulated aircraft system, a virtual aircraft structure subsystem may comprise one or more virtual mechanical components. Failure of any one of virtual mechanical components, or the virtual aircraft structure subsystem altogether, may be based on accumulated mechanical stress considering use time (e.g., number of flights and operating hours) and also based on maneuvers caused by the pilot manipulating the one or more tangible instruments.

Figure 2:
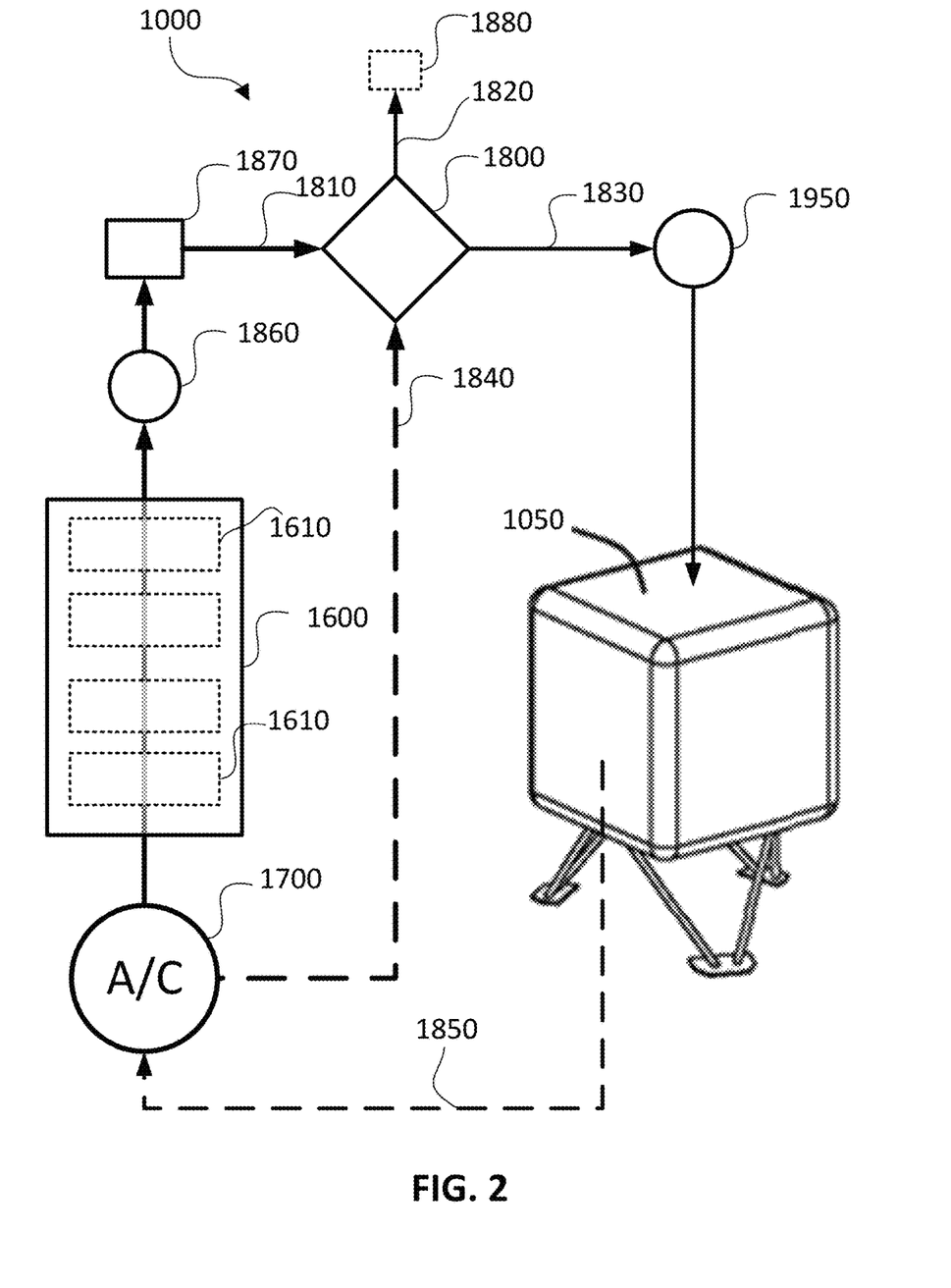
FIG. 2 is a logical modular view of an exemplary system for controllably adjusting temperature of a training area of an interactive training simulator performing an interactive computer simulation in accordance with an embodiment of the present invention.

Reference is now concurrently made to FIG. 1 and to FIG. 2. The interactive training interactive computer simulation system 1000 is associated with a non-simulated area (NSA) 1600 housing electronic components 1610 used for performing the interactive computer simulation. In some embodiments, the processor module 1130 is completely or partly housed in the NSA 1600. In the depicted example of FIG. 1 and FIG. 2, the NSA 1600 is depicted as a structurally independent portion of the interactive training interactive computer simulation system 1000 while, in some embodiments, the NSA 1600 may be juxtaposed to the training are 1050.

The interactive training interactive computer simulation system 1000 also comprises a ventilation and air conditioning (VAC) unit 1700 configured for cooling the electronic components 1610 of the NSA 1600 by circulating a forced airflow therethrough when the interactive training simulator is in use.

The system for controllably adjusting temperature of the training area 1050 comprises the processor module 1130 of the interactive computer simulation station 1100. In some embodiments, the trainees or the instructor seated in the training area 1050 are able to defining the target temperature level for the training area when the interactive training simulator is in use, for instance, by using the tangible instrument module 1160 for sending instructions to the processor module 1130 (e.g., a replicated temperature control selector in a replicated aircraft or a thermostat in an emergency room). The processor module 1130 may also allow modifying the target temperature level at least once during the interactive computer simulation and based on events related to the interactive computer simulation being performed in the interactive training simulator. For instance, during the course of an interactive computer simulation the target temperature level may be modified considering simulated pressurization status (depressurization leading to decrease in temperature) and/or simulated equipment failure, which may lead to increased or decreased temperature level (e.g., simulated electrical component overheat, simulated heater malfunction, etc.).

The system for controllably adjusting temperature of the training area further comprises an airflow selector unit 1800, controlled by the processor 1130 that selectively and operatively transfers heat from the forced airflow to the training area for maintaining the modified target temperature level.

For instance, during a typical training session, at least one trainee and one instructor are seated in the training area 1050 inside the interactive computer simulation system 1000. The instructor operating system (IOS) 1340 of the training area may be used for managing the interactive computer simulation, the processor module 1130 of the system being operatively connected to the IOS 1340 for triggering, by the instructor and via the IOS 1340, the events related to the interactive computer simulation for modifying the target temperature level. Alternatively, the instructor may directly modify via the IOS 1340 the target temperature level.

As another example, during a training session, one or more trainee may be seated in the training area 1050 inside the interactive computer simulation system 1000. The instrument modules 1160 of the interactive computer simulation system 1000 may be used for interactively controlling a simulated element in the interactive computer simulation, the processor module 1130 of the system being operatively connected to the instrument module 1160 for triggering, by the at least one trainee and via the instrument module, the events related to the interactive computer simulation for modifying the target temperature level. Alternatively, the at least one trainee may modify via the instrument module 1160 the target temperature level.

The system may further comprise a temperature tracking module 1900 for continuously monitoring and tracking the temperature level in the training area. The temperature tracking module 1900 may comprise at least one electronic thermometer located into the training area 1050 and in communication with the processor module 1130, optionally via the BUS 1170 or the network interface module 1140.

In addition to measuring and tracking the temperature inside the training area of the interactive training simulator, the processor module 1130 may also allow defining at least one non-temperature-related ambient environment parameter of the training area. The system may further comprise at least one sensor for continuously monitoring and tracking the ambient environment parameter(s) of the training area. Each sensor may be configured to measure at least one of: a level of humidity, a concentration of gas comprising carbon monoxide, carbon dioxide, oxygen, nitrogen or ozone, a concentration of at least one volatile organic compound (VOC), or a concentration of fine particles.

The system may further comprise an injecting module (not shown) for injecting an amount of at least one aroma and/or smoke into the forced airflow upwardly the training area 1050 for simulating a variation of smell into the training area. The smell may correspond to a real smell such as a smell of smoke for simulating a fire in the simulated aircraft. Alternatively, a non-hazardous smell can be selected to simulate a hazardous substance like carbon dioxide, gasoline, etc.

In some embodiments, the airflow selector unit system 1800 of the system 1000 may comprise at least one air duct 1810 connecting the VAC 1700 and the NSA 1600 to the training area 1050. Each air duct may comprise an airflow divider 1820 controlled by the processor module 1130 for dividing the forced airflow upwardly from the training area and injecting only a defined portion 1830 of the forced airflow into the training area 1050. Each air duct may further comprise an airflow combiner 1840 operatively controlled by the processor module 1130 for combining the forced airflow entering the training area with a fresh airflow for cooling the forced airflow entering the training area 1050.

In certain embodiments, the system may also comprise a heating unit 1950, which may be used when heat from the electronic components of the NSA is insufficient for maintaining the target temperature level inside the training area. In such a case, the heating unit 1950 is operatively connected to the air duct 1810 connecting the NSA 1600 to the training area 1050. The heating unit 1950 is operated via the processor module 1130. The heating unit 1950 can produce a flow of hot air for injection into the duct, or a heater adjacent or surrounding the duct for heating the forced airflow going through the duct. The system may be said to be a "hybrid" system when both the supplemental heater 1950 and the NSA's electronic components 1610 for used for heating the airflow.

As illustrated on FIG. 2, the system 1000 may further comprise another air duct 1850 connecting the training area 1050 to the NSA 1600 for capturing air from the training area, transferring the air from the training area to the NSA, and combining the captured air with the forced airflow going through the NSA, forming as such an airflow loop circuit between the interactive training simulator and the NSA. For instance, the airflow loop circuit may be useful when the target temperature in the training area 1050 is lowered to simulate cold conditions and when the temperature of the airflow exiting the training area 1050 is sufficiently low to cool the electronic components 16010 of the NSA 1600.

FIG. 1 shows a logical arrangement of different physical components of an exemplary ventilation stack 1110 whose components are also depicted on FIG. 2. As illustrated on FIG. 2, the NSA 1600 may be structurally independent from the interactive computer simulation system 1000. Alternatively, the NSA 1600 may be housed inside the interactive computer simulation system 1000. The VAC 1700 may also be either structurally independent from the interactive computer simulation system 1000 or the NSA 1600, or housed inside or adjacent the interactive computer simulation system 1000 or housed inside or adjacent the NSA 1600.

The system 1000 may further comprise a volatile organic compounds (VOC) sensor 1860 operatively connected to the transferring unit for measuring upwardly from the interactive training simulator an amount of at least one volatile organic compound (VOC) generated by the electronic components of the NSA 1600. The system may then further comprise an alert unit operatively connected to the VOC sensor 1860 configured for generating an alert when a given hazardous threshold of VOCs is measured by the VOC sensor 1860. The alert unit may then trigger the airflow divider 1820 via the processor module 1130 for expunging 100% of the airflow avoiding as such the forced airflow comprising the VOC to enter the training area 1050.

Figure 3:
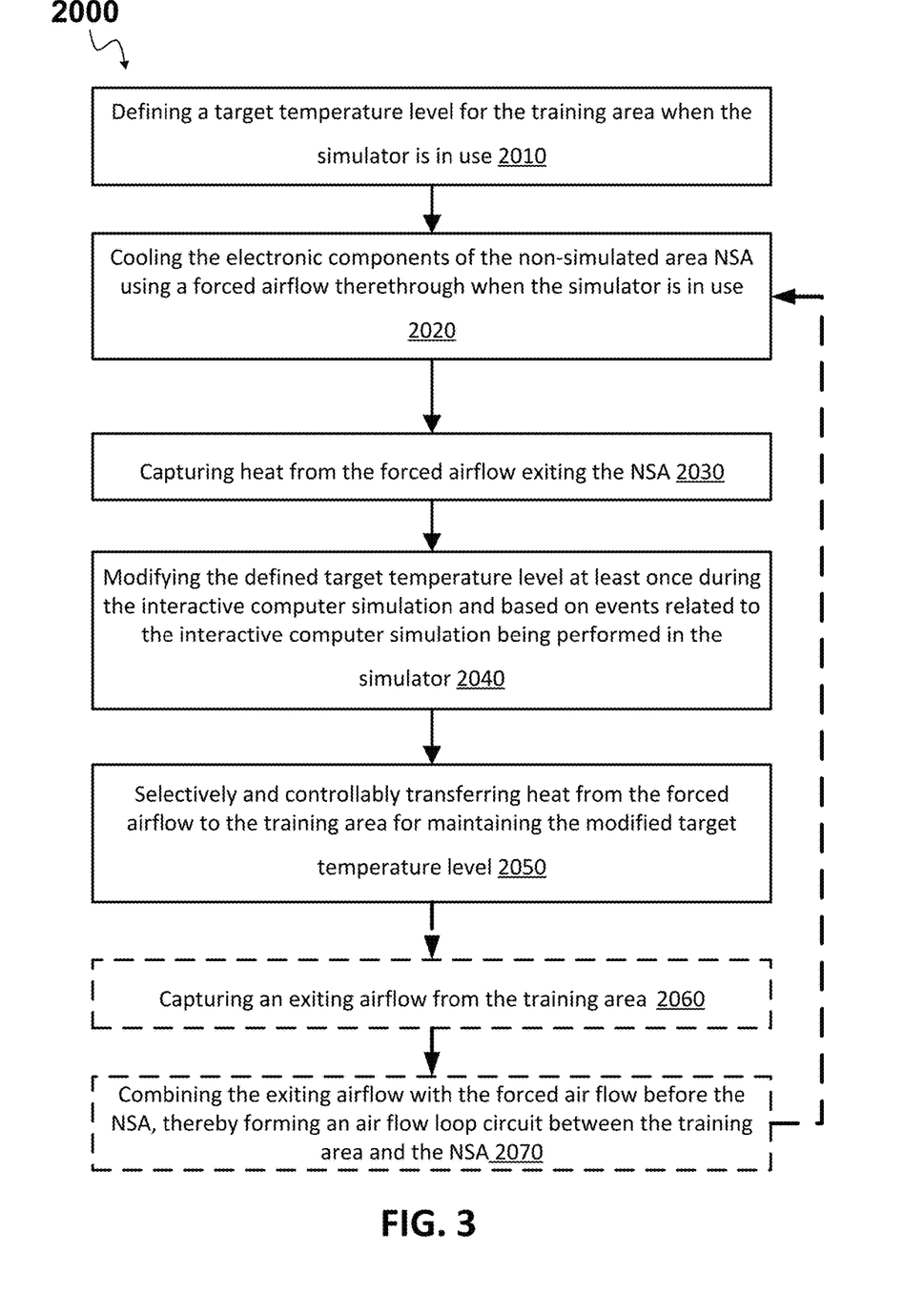
FIG. 3 is a flow chart of an exemplary method in accordance with the teachings of the present invention.

Reference is now concurrently made to FIG. 3, which shows a flow chart of an exemplary method 2000 in accordance with the teachings of the present invention. The method 2000 allows controllably adjusting temperature of a training area of an interactive training interactive training simulator performing an interactive computer simulation, the training area hosting one or more users and the interactive training simulator associated with a non-simulated area (NSA) housing electronic components used for performing the interactive computer simulation. One or more tangible instrument modules 1160, 1260, 1360 are provided in the interactive computer simulation system 1000 for controlling one or more virtual simulated element. The tangible instrument provided by the instrument modules 1160, 1260 and/or 1360 are tightly related to the element being simulated. In the example of the simulated aircraft system, typical instruments include various switches, levers, pedals and the like accessible to the user for controlling the aircraft in the interactive computer simulation. Depending on the type of simulation (e.g., level of immersion), the tangible instruments may be more or less realistic compared to those that would be available in an actual aircraft. For instance, the tangible instrument provided by the modules 1160, 1260 and/or 1360 may replicate an actual aircraft cockpit where actual instruments found in the actual aircraft or physical interfaces having similar physical characteristics are provided to the user (or trainee). One or more mechanical instrument actuator 1166 may be provided to physical move components of the instrument modules 1160, e.g., in accordance with events from the interactive computer simulation. As previously described, the actions that the user or trainee takes with one or more of the tangible instruments provided via the instrument module(s) 1160, 1260 and/or 1360 (modifying lever positions, activating/deactivating switches, etc.) allow the user or trainee to control the virtual simulated element in the interactive computer simulation. In the context of an immersive simulation being performed in the interactive computer simulation system 1000, the instrument module 1160, 1260 and/or 1360 would typically support a replicate of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiments, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the computer system 1000. The external input/output (I/O) module 1162 of the instrument module 1160, 1260 and/or 1360 may connect one or more external tangible instruments (not shown) therethrough. The external I/O module 1162 may be required, for instance, for interfacing the interactive computer simulation system 1000 with one or more tangible instrument identical to an Original Equipment Manufacturer (OEM) part that cannot be integrated into the interactive computer simulation station 1100 and/or the simulation station(s) 1200, 1300 (e.g., a tangible instrument exactly as the one that would be found in the actual system subject of the interactive simulation). The internal input/output (I/O) module 1164 of the instrument module 1160, 1260 and/or 1360 may connect one or more tangible instruments integrated with the instrument module 1160, 1260 and/or 1360. The I/O 1164 may comprise necessary interface(s) to exchange data, set data or get data from such integrated tangible instruments. The internal I/O module 1164 may be required, for instance, for interfacing the interactive computer simulation system 1100 with one or more integrated tangible instrument identical to an Original Equipment Manufacturer (OEM) part (e.g., a tangible instrument exactly as the one that would be found in the actual system subject of the interactive simulation). The I/O 1164 may comprise necessary interface(s) to exchange data, set data or get data from such integrated tangible instruments.

As illustrated in FIG. 3, the method 2000 comprises defining 2010 a target temperature level for the training area when the interactive training simulator is in use. The ideal target temperature level in the training area is generally around 18-22° C. The target temperature level can be triggered for simulating cold or very cold temperature, for instance in case of depressurization of the aircraft.

Once the target temperature level is configured via the processor module 1130, the method 2000 also comprises cooling 2020 the electronic components of the NSA using a forced airflow therethrough when the interactive training simulator is in use. As shown in FIGS. 1 and 2, the airflow can be provided by the VAC injecting cold air through the electronic components. The method also comprises capturing 2030 heat from the forced airflow exiting the NSA. The heat can be captured by merely transferring the airflow, at least partially, to the training area. Alternatively, the airflow can be used for heating a secondary airflow, preventing VOC from potentially contaminating the air of the training area. Depending on the techniques being used, an important portion of heat may however be lost by using a secondary airflow.

As illustrated in FIG. 3, the method 2000 also comprises at least once during the interactive computer simulation, modifying 2040 the defined target temperature level based on events related to the interactive computer simulation being performed in the interactive training simulator.

As illustrated in FIG. 3, the method 2000 further comprises selectively and controllably transferring 2050 heat from the forced airflow to the training area for maintaining the modified target temperature level.

Figure 4:
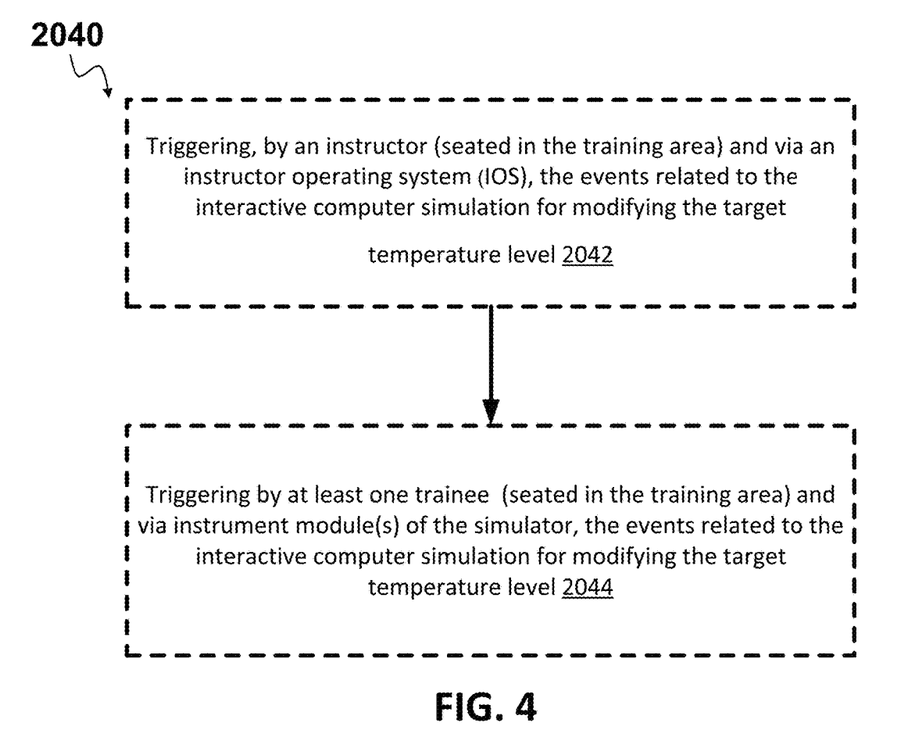
FIG. 4 is a flow chart of an exemplary embodiment of the method in accordance with the teachings of the present invention.

In some embodiments, and as aforesaid, the interactive training simulator may comprise an instructor operating system (IOS) 1340 in the training area for managing the interactive computer simulation. The one or more users seated in the training are may comprise at least one trainee and one instructor of the at least one trainee. As illustrated in FIG. 4, the step of modifying 2040 the defined target temperature level may comprise triggering 2042, by the instructor and via the IOS, the events related to the interactive computer simulation for modifying the target temperature level. Alternatively, the instructor may directly modify via the IOS the target temperature level. The interactive training simulator comprises instrument module(s) 1160, 1260, 1360 for interactively controlling a simulated element in the interactive computer simulation. The step 2040 may thus also comprise triggering 2044, by at least one trainee seated in the training are and via the instrument module(s), the events related to the interactive computer simulation for modifying the target temperature level 2044. Alternatively, the trainee(s) may modify, still via the instrument module(s), the target temperature level.

In some embodiments, the method 2000 may further comprise continuously monitoring and tracking a temperature level of the training area, for instance using the temperature tracking module 1900 detailed herein above. Additionally, the method 2000 may allow defining non-temperature-related ambient environment parameters for the training area such as a level of humidity, an air pressure, gas concentrations, volatile organic compound (VOC) concentrations, particles and fine-particles presence and concentration. The method 2000 then will also comprise continuously monitoring and tracking those parameters of the training area, for instance by measuring the level of humidity, the air pressure, the concentration of gas (generally comprising carbon monoxide, carbon dioxide, oxygen, nitrogen or ozone), the concentration of VOC and/or the concentration of (fine)-particles. As for the temperature inside the training area, the users (trainee(s) or instructor) may modify via the instrument module(s) 1160, 1260, 1360 or the IOS 1340 the non-temperature-related ambient environment parameters of the training area by modulating the level of humidity, the concentration of gas, the concentration of at least one volatile organic compound (VOC), or the concentration of fine particles. To do so, the forced airflow may be routed through specific filters 1870 configured for filtering or capturing water molecules for drying the air and lowering the humidity level, the gas mentioned above, the VOC or the fine particles.

In some embodiments, the method 2000 may further comprise injecting an amount of at least one aroma into the training area for simulating a variation of smell into the training area. To do so, and as aforesaid, an injecting module (not shown) may be used to inject the aroma(s) into the forced airflow before entering the training area. Each aroma is intended to simulate a variation of smell into the training area that can be related to a specific danger, such as the smell of smoke for simulating a fire in the simulated aircraft. Specific non-hazardous smell can be associated with hazardous substance like carbon dioxide, gasoline, or the like, to simulate the presence of these dangerous substances into the training area.

Figure 5:
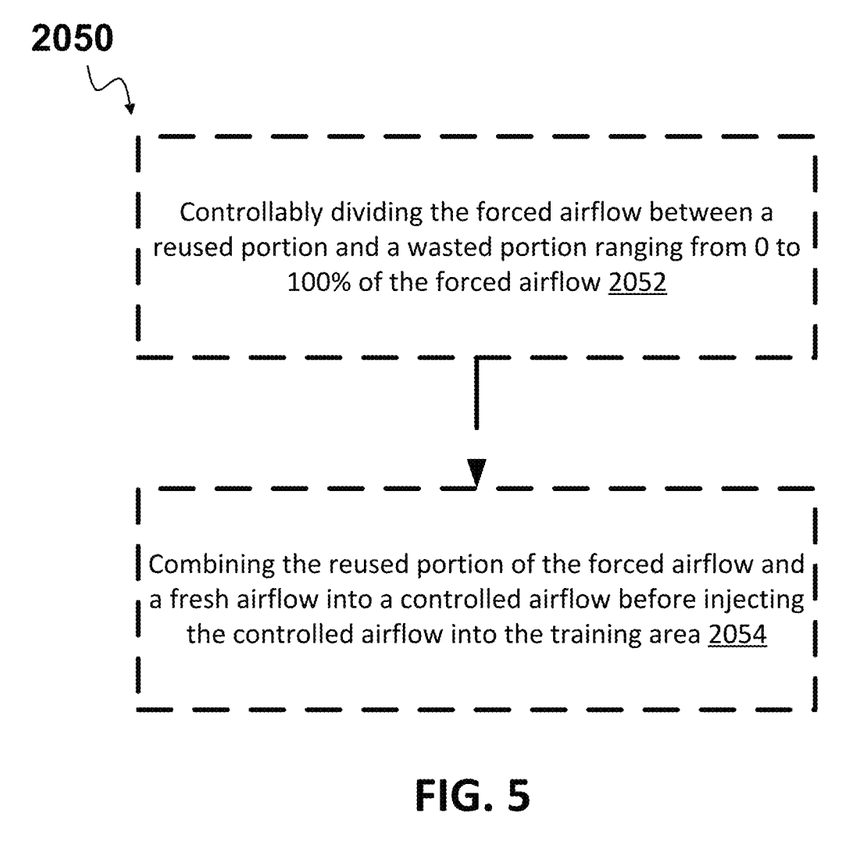
FIG. 5 is a flow chart of an exemplary embodiment of the method in accordance with the teachings of the present invention.

As illustrated in FIG. 5, the step of selectively and controllably transferring 2050 heat from the forced airflow to the training area for maintaining the modified temperature level in the training area may optionally be performed by controllably dividing 2052 the forced airflow between a reused portion and a wasted portion ranging from 0 to 100% of the forced airflow, for instance by triggering the airflow selector unit 1800. The wasted airflow may be discarded outside the interactive training simulator into the ambient atmosphere 1880. By dividing the forced airflow, the system will inject into the training area the amount of heat necessary for varying or maintaining the target temperature level inside the training area. If the amount of heat remains too high, the reused portion of the forced airflow (i.e., 0% to 100%) may be combined 2054 with a fresh airflow before entering the training area to form a controlled airflow. The controlled airflow is then injected into the training area. The fresh airflow may be provided by the VAC unit 1700 already in use for cooling the electronic components of the NSA 1600, or by a second VAC unit operatively connected to the duct transferring the forced airflow from the NSA to the training area. Reaching colder temperature may require additional cooling equipment that skilled persons will readily be able to identify.

In case the amount of heat produced by the electronic components of the NSA does not allow maintaining the target temperature level inside the training area, the method may also comprise the step of heating the forced airflow exiting the NSA. As aforesaid, a supplemental heating unit 1950, operated via the processor module 1130, may be operatively connected to the air duct 1810 connecting the NSA 1600 to the training area 1050.

In some embodiments already discussed herein above, the system may form an airflow loop circuit between the training area and the NSA. To do so, the method may further comprise the step of capturing an exiting airflow from the training area and combining the exiting airflow with the forced airflow produced by the VAC before being injected into the NSA.

As already discussed herein above, some volatile organic compounds (VOCs) generated by the electronic components of the NSA may contaminate the airflow going through the NSA, for instance if the electronic equipment overheats or accidently burns. The VOCs concentration may also increase due to the recycling of the airflow using the loop circuit mentioned above. The system may therefore respect at least the Restriction of Hazardous Substances in Electrical and Electronic Equipment (RoHS 2—Directive 2011/65/EU). The method 2000 thus may further comprise the step of measuring or monitoring, upwardly the interactive training simulator, the amount of the VOC generated by the electronic components of the NSA. Preferably, the method 2000 further comprises the step of generating an alert when a given hazardous threshold of VOCs is measured. More preferably, the method will comprise the step of avoiding the forced airflow comprising the VOC to enter the training area when the given threshold of VOCs is reached.

As illustrated in FIG. 2, the invention also concerns an interactive training interactive computer simulation system 1000 performing an interactive computer simulation which include the system disclosed herein for controllably adjusting a temperature of the training area 1050 of the interactive training simulator.

Figure 6:
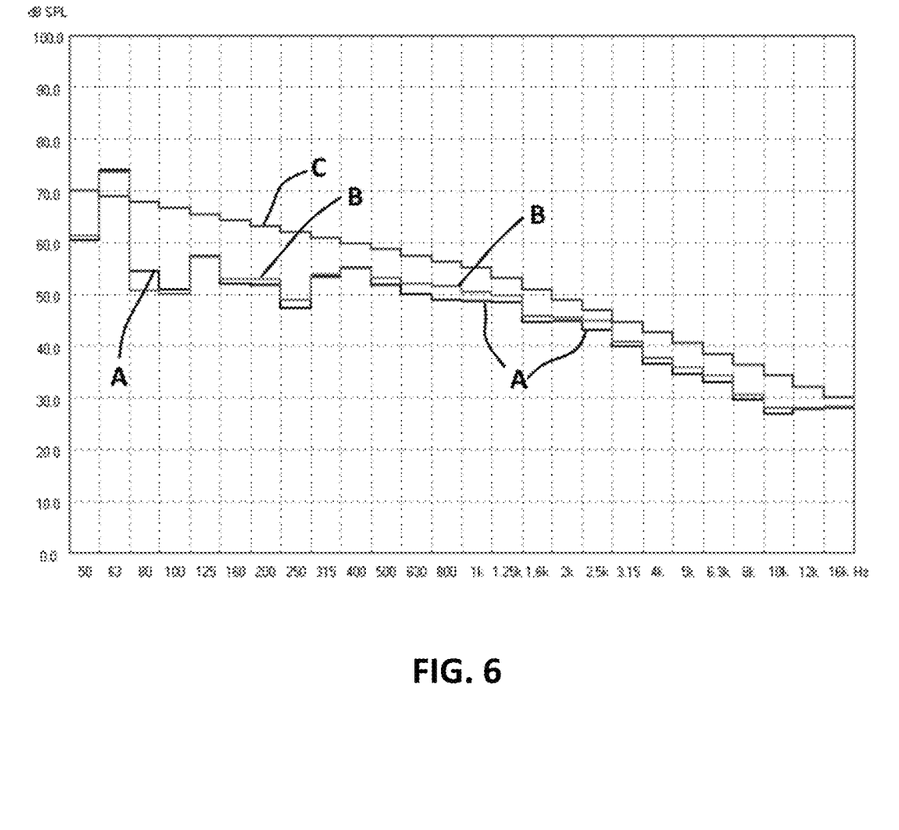
FIG. 6 is a graphic showing the results of a bench test for measuring noise impact of the system in accordance with an embodiment of the present invention.

FIG. 6 shows results of a bench test measuring the ambient noise (dB) in the seating area in function of the frequency (Hz). The noise recordings were performed on a full-flight simulator, model 114064 FFS. Line A is the simulator ambient noise using legacy heating. The legacy heating system was set with the air conditioning valve fully open (maximum of airflow). Line B is the simulator ambient noise using the system according to the present invention. The VAC of the system was also set to a maximum speed with the air conditioning valve fully open. Line C is the certification maximum noise level. The results show that there is a negligible change in the noise level which remains below the maximum noise level recommended by the certification circular (e.g., as those from the International Civil Aviation Organization (ICAO), the Federal Aviation Administration (FAA) in the USA, the National Civil Aviation Agency (ANAC) in Brazil, the European Aviation Safety Agency (EASA) in the European Union and equivalent sources in other countries). Therefore, the system according to the present invention can be implemented without an impact on the sound QTG results.

The system as disclosed herein is eco-friendly in that it allows for each interactive training simulator saving energy while maintaining or improving quality of the interactive training simulation, the energy saving in some embodiments, is evaluated to about 26000 kWh per year, which corresponds to about 18 tons of $CO_2$ per year.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different units or modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A method for controllably adjusting temperature of a training area of an interactive training simulator performing an interactive computer simulation, the training area hosting one or more users and the interactive training simulator associated with a non-simulated area (NSA) housing electronic components used for performing the interactive computer simulation, the method comprising:

defining a target temperature level for the training area when the interactive training simulator is in use;

cooling the electronic components of the NSA using a forced airflow therethrough when the interactive training simulator is in use;

capturing heat from the forced airflow exiting the NSA;

modifying the defined target temperature level at least once during the interactive computer simulation and based on one or more events related to the interactive computer simulation being performed in the interactive training simulator; and selectively and controllably transferring heat from the forced airflow to the training area for maintaining the modified target temperature level.

2. The method of claim 1, wherein the interactive training simulator comprises an instructor operating system (IOS) in the training area for managing the interactive computer simulation, and the one or more users comprising at least one trainee and one instructor of the at least one trainee, the method comprising:

triggering, by the instructor and via the IOS, the events related to the interactive computer simulation for modifying the target temperature level.

3. The method of claim 1, wherein the interactive training simulator comprises an instrument module for interactively controlling a simulated element in the interactive computer simulation, and the one or more users comprising at least one trainee, the method comprising:

triggering, by the at least one trainee and via the instrument module, the events related to the interactive computer simulation for modifying the target temperature level.

4. The method of claim 1, further comprising:

defining at least one non-temperature-related ambient environment parameter for the training area; and continuously monitoring and tracking the at least one ambient environment parameter of the training area.

5. The method of claim 4, wherein continuously monitoring and tracking the at least one ambient environment parameter of the training area comprises measuring at least one of: a level of humidity, a concentration of gas comprising carbon monoxide, carbon dioxide, oxygen, nitrogen or ozone, a concentration of at least one volatile organic compound (VOC), or a concentration of fine particles.

6. The method of claim 1, further comprising injecting an amount of at least one aroma into the training area for simulating a variation of smell into the training area.

7. The method of claim 1, wherein selectively and controllably transferring heat from the forced airflow to the training area for maintaining the modified temperature level in the training area comprises:

controllably dividing the forced airflow between a reused portion and a wasted portion ranging from 0 to 100% of the forced airflow, and optionally combining the reused portion of the forced airflow and a fresh airflow into a controlled airflow before injecting the controlled airflow into the training area.

8. The method of claim 1, further comprising:

capturing an exiting airflow from the training area, and combining the exiting airflow with the forced airflow before the NSA, thereby forming an airflow loop circuit between the training area and the NSA.

9. The method of claim 1, wherein the NSA is structurally independent from the interactive training simulator.

10. A system for controllably adjusting temperature of a training area of an interactive training simulator performing an interactive computer simulation, the training area being configured for hosting one or more users and the interactive training simulator being associated with a non-simulated area (NSA) housing electronic components used for performing the interactive computer simulation, the system comprising:
- a processor module for defining a target temperature level for the training area when the interactive training simulator is in use, and for modifying the target temperature level at least once during the interactive computer simulation and based on one or more events related to the interactive computer simulation being performed in the interactive training simulator;
- a ventilation and air conditioning (VAC) unit configured for cooling the electronic components of the NSA by circulating a forced airflow therethrough when the interactive training simulator is in use; and
- an airflow selector unit, controlled by the processor module that is operatively configured to transfer heat from the forced airflow to the training area for maintaining the target temperature level or for modifying and maintaining the modified target temperature level.

11. The system of claim 10, wherein the one or more users comprise at least one trainee and one instructor of the at least one trainee, and the interactive training simulator comprises an instructor operating system (IOS) in the training area for managing the interactive computer simulation, the processor module of the system being operatively connected to the IOS for triggering, by the instructor and via the IOS, the events related to the interactive computer simulation for modifying the target temperature level.

12. The system of claim 10, wherein the one or more users comprises at least one trainee and the interactive training simulator comprises an instrument module for interactively controlling a simulated element in the interactive computer simulation, the processor module of the system being operatively connected to the instrument module for triggering, by the at least one trainee and via the instrument module, the events related to the interactive computer simulation for modifying the target temperature level.

13. The system of claim 10, wherein the processor module also allows defining at least one non-temperature-related ambient environment parameter of the training area, the system further comprising at least one sensor for continuously monitoring and tracking the at least one ambient environment parameter of the training area.

14. The system of claim 10, wherein the airflow selector unit comprises at least one air duct connecting the VAC and NSA to the training area, each air duct comprising an airflow divider controlled by the processor module for dividing the forced airflow upwardly from the training area and injecting only a defined portion of the forced airflow into the training area.

15. The system of claim 14, wherein each air duct comprising an airflow combiner operatively controlled by the processor module for combining the forced airflow entering the training area with a fresh airflow for cooling the forced airflow entering the training area.

16. The system of claim 15, further comprising another air duct connecting the training area to the NSA for capturing air from the training area, transferring the air from the training area to the NSA, and combining the captured air with the forced airflow going through the NSA, forming as such an airflow loop circuit between the interactive training simulator and the NSA.

17. The system of claim 16, wherein the NSA is structurally independent from the interactive training simulator.

18. The system of claim 16, further comprising a VOC sensor operatively connected to the airflow selector unit for measuring upwardly from the training area an amount of at least one volatile organic compound (VOC) generated by the electronic components of the NSA.

19. The system of claim 16, wherein the interactive training simulator is a flight simulator and the training area is a cockpit of the flight simulator replicating an actual cockpit from an actual aircraft.

20. An interactive training simulator performing an interactive computer simulation and including the system of claim 16 for controllably adjusting a temperature of the training area of the interactive training simulator.

* * * * *